United States Patent
Caruso, Jr.

[15] 3,689,924
[45] Sept. 5, 1972

[54] RECONNAISSANCE AND GUIDANCE MICROWAVE RADIO-METRIC SYSTEM

[72] Inventor: Philip J. Caruso, Jr., 15611 Del Prado Drive, Hacienda Heights, Calif. 91745

[22] Filed: Sept. 18, 1968

[21] Appl. No.: 760,593

[52] U.S. Cl. .......343/100 ME, 343/100 PE, 343/117
[51] Int. Cl. ..............................................G01w 1/00
[58] Field of Search.............343/100 RA, 100.3, 117

[56] References Cited

UNITED STATES PATENTS 3,028,596  4/1962  McGillem et al...343/100RAD UX

*Primary Examiner*—Benjamin A. Borchelt
*Assistant Examiner*—Richard E. Berger
*Attorney*—Jessup & Beecher

[57] ABSTRACT

A microwave radiometric system is provided for reconnaissance and guidance purposes which responds to polarized microwave radiations from the terrain under observation. The system utilizes such radiations to distinguish different materials in the observed area, and it may also be designed to use selected materials in the observed area for tracking purposes. The system to be described includes a sensitive radiometric receiver and directional antenna, and it utilizes a relatively simple linear processing system for the received signals, rather than the prior art ratio approach.

1 Claim, 4 Drawings Figures

Background Suppression Radiometer Reconnaissance System Using Linear Signal Processing Background Suppression Radiometer Reconnaissance System Using Linear Signal Processing INVENTOR.
Philip J. Caruso, Jr.

Lobe Comparison Tracking Using Background Suppression Radiometer

Conical Scan Tracking Using Background Suppression Radiometer

INVENTOR.
Philip J. Caruso, Jr.

RECONNAISSANCE AND GUIDANCE MICROWAVE RADIO-METRIC SYSTEM

BACKGROUND OF THE INVENTION

A microwave radiometer is an ultra-sensitive radio receiver which receives its signals from a directional antenna, the antenna being directed at the element, terrain or area to be observed. The amplitude of the received signals is proportional to the temperature of the materials detected in the observed area, as modified by the temperature reflected by such materials and the characteristics of the materials themselves.

At microwave frequencies in the range, for example, of about 3 GHz to 300 GHz, the amplitude of the radiated electromagnetic energy varies directly with ambient temperature T, rather than with the fourth power of T, as occurs at the infrared region of the spectrum; this being in accordance with Planck's radiation curve. The radiated energy is much less at the microwave frequency than in the infrared frequency range. However, the amount of energy radiated at the microwave frequencies is till significant, and signals representative thereof may be received and detected by sensitive present-day microwave sensors.

The detection of radiations in the microwave frequency range by the microwave radiometer has an advantage over the infrared and radar sensors, especially for aerial reconnaissance and guidance purposes, in that the microwave radiations are passive, wide band, and difficult to jam. Moreover, the microwave radiations, unlike the infrared, are substantially independent of weather conditions and may, for example, be detected through cloud banks and other media which normally absorb and obscure the infrared radiations.

Another advantage in the use of the microwave radiometer system for aerial reconnaissance and guidance purposes is that the material parameters of different objects in the observed area are much more significant in affecting the amplitude of the radio signals, and, therefore, may be more easily distinguished by microwave radiometers than by infrared sensors.

For example, as mentioned above, the apparent temperature T being radiated to and collected by the antenna of a microwave radiometer is, in general, the combination of the different temperatures from three sources; namely, the emitted energies, the reflected energies, and the transmissive energies. The apparent temperature $T$, therefore, may be expressed by the following equation:

$$T = \epsilon T_a + \rho T_s + \tau T_b \quad (1)$$

Where: $\epsilon$, $\rho$, and $\tau$ are the emissivity, reflection and transmissivity coefficients respectively; and $T_a$, $T_s$ and $T_b$ are the ambient temperatures of the material, the reflected sky temperature, and the transmissive temperature, respectively, measured in degrees Kelvin. The usual case for terrain sensing has $\tau = 0$ and $\epsilon + \rho = 1$.

These various ambient temperatures vary from material to material, so that different materials may be distinguished in the area under observation. Thus the apparent temperature T being radiated is actually a measurement of the material parameters, as well as temperature and, in addition, is a function of the composite area or terrain observed by the antenna beam.

When the microwave radiometer is used for reconnaissance or guidance purposes, a problem arises as to the suppression of unwanted signals, such as terrain background, and in distinguishing desired signals radiated, for example, from metallic objects such as trucks, mortars and the like within the observed area from the unwanted signals.

Systems have been devised in the using microwave radiometry techniques for reconnaissance purposes. However, such systems for the most part have not proven to be completely satisfactory due to certain inherent deficiencies. These deficiencies arise from the fact that the prior art systems are predicated on a principle of utilizing a ratio of the horizontal and vertical polarization characteristics of the received signals as a temperature discrimination basis. That is, the detector capabilities of one prior art system, for example, utilizes the following type signal ratio, $R$:

$$R = \frac{\frac{1}{2}(T_v + T_h)}{T_v - T_h} \quad (2)$$

Where: $T_v$ is the amplitude of the received vertically polarized microwave signals; and $T_h$ is the amplitude of the received horizontally polarized microwave signals.

The use of such a ratio in various forms creates certain limitations in the prior art system and these include, inter alia, the fact that the threshold detection of the ratio $R$ is dependent upon the incidence angle of the antenna beam and upon weather conditions. Therefore, this threshold must be adjusted continually. Moreover, the aforesaid ratio approach cannot be used in any known type of null tracking systems for guidance purposes, due to its inability to form error signals on any particular material in the observed area on which the antenna beam may be tracked. In addition, the non-linear processing required for the formulation of an output representative of the ratio $R$ in the prior art system makes it difficult to quantify its performance in terms of detectability.

Polarization characteristics are well known physical laws. The manner in which the polarized signals are processed is the object of the invention. As indicated above, polarization effects of the microwave radiations from the area under observation are used in the radiometric system of the invention to distinguish a material within the observed area. The polarization of an electromagnetic microwave is characterized by the direction of its electric and magnetic intensities. For example, a plane microwave progating in the $z$ direction has mutually perpendicular electric and magnetic intensities in the $xy$ plane. If the electric intensity, for example, is polarized along one direction, for example, the horizontal axis, the wave is said to be horizontally polarized ($T_h$). If, on the other hand, it is polarized along the vertical axis, it is said to be vertically polarized ($T_v$).

In microwave radiometry, all substances which are inherently smooth, that is substances which exhibit roughnesses of less than a wave length, tend to have specular characteristics and tend to radiate polarized signals. Moreover, those materials which exhibit the coolest apparent temperature ($T$) tend to radiate more highly polarized signals. An exception to this is metal, which is considered to have infinite conductivity, and whose radiations are not polarized. Diffused material such as grass and vegetation, likewise, tend to radiate unpolarized signals. However, these may be distinguished from metal in that they exhibit a much higher apparent temperature (T).

In the radiometric system of the present invention, all background, regardless of the heterogeneous nature of the elements which go to make up the background, is suppressed. That is, the system of the present invention effectively causes all the materials in the observed area to appear alike and to assume the composition of a homogeneous background, insofar as the radio meter output is concerned. However, the presence of metal in the observed area, for example, causes the amplitude of the composite output to rise above a preset threshold, so that its presence may be detected and used, for example, for tracking purposes.

In the improved radiometer to be described herein, for example, the polarized radiations from a particular group of materials are all made to appear as the same non-varying background. This enables a fixed threshold to be set which determines the presence of metal in the observed area, since metal alone has the capability of causing the composite signal to exceed the pre-established threshold.

In the radiometric system to be described, an ancillary unit is utilized to measure the incidence angle of the antenna beam. This ancillary unit, for example, may be a pendulum system mounted on board the aircraft, missile, or other vehicle on which the radiometric system of the invention is incorporated. With an appropriate control from the aforesaid ancillary unit, the radiometric system may be made insensitive to the incidence angle of the antenna beam. This radiometric system is also inherently insensitive to changes in weather, so that the aforesaid detection threshold remains fixed under all conditions.

The linear processing of the received polarized microwave signals by the radiometer of the invention may be carried out in accordance with any one of the following three equations. In the ensuing description, only one type of processing will be developed in detail. It will become evident as the description proceeds, however, that the others may be developed in the same manner.

$$(T_v\ T_h) + k_{f\ 1}(T_v - T_h) = T_{background} \quad (3)$$

$$T_v + K_{f\ 2}(T_v - T_h) = T_{background} \quad (4)$$

$$T_h + K_{f\ 3}(T_v - T_h) = T_{background} \quad (5)$$

DETAILED DESCRIPTION OF THE ILLUSTRATED EMBODIMENT

Figure 1:
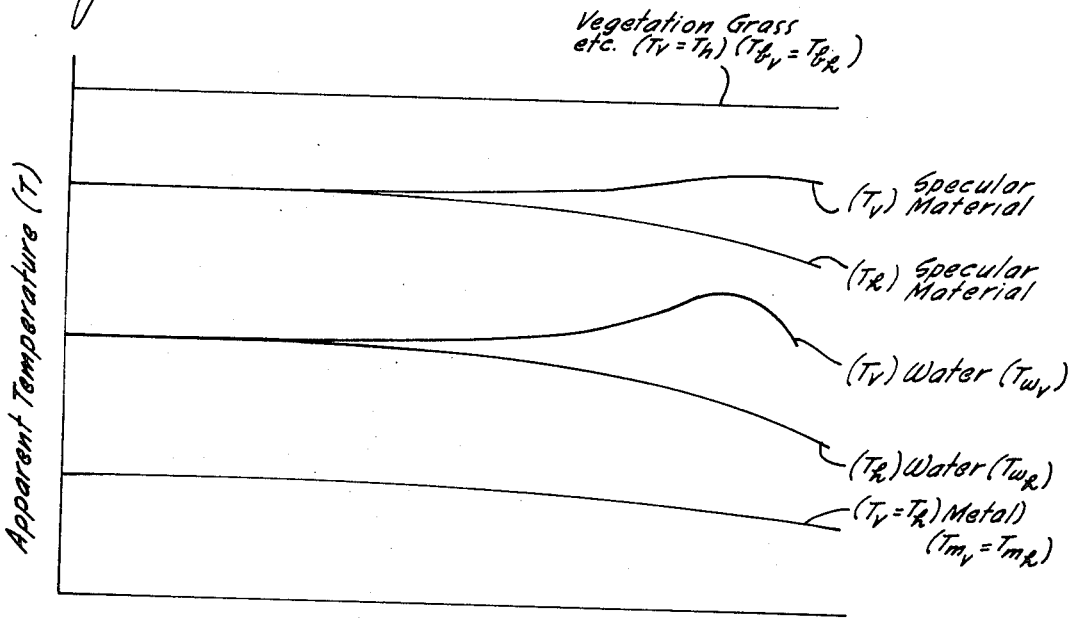
FIG. 1 is a series of curves showing the general manner in which the microwave signals radiated by various materials in an area scanned by a receiving antenna beam are polarized as a function of the incidence angle of the antenna beam.
Figure 2:
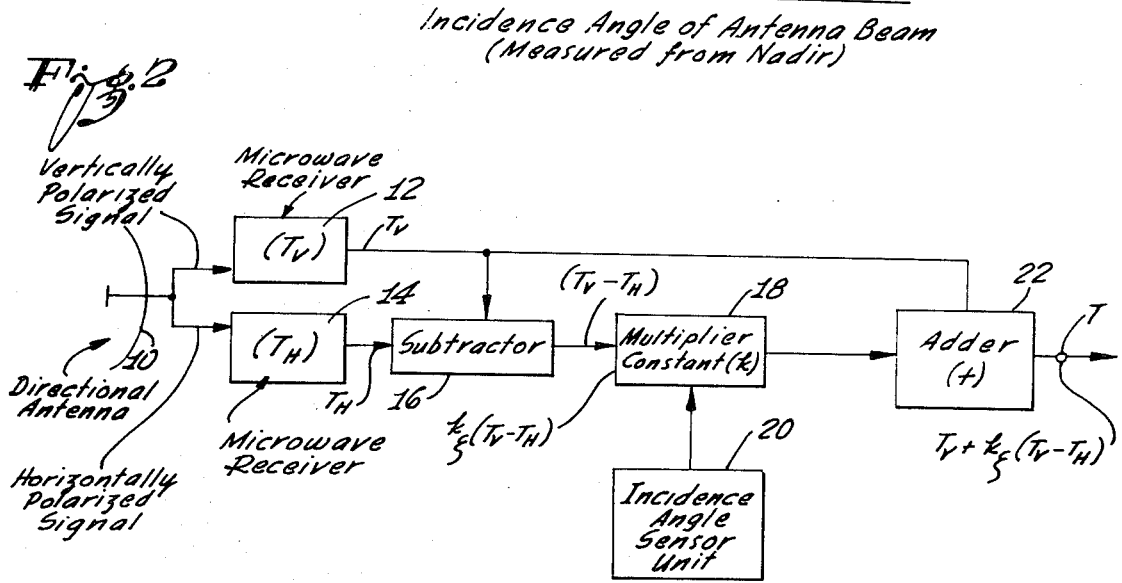
FIG. 2 is a block diagram of a radiometric system which may be constructed to incorporate the principles of the present invention, and which may be used, for example, for reconnaissance purposes.

As shown by the curves of FIG. 1, all substances which are smooth and which have specular characteristics tend to be polarized. Also, the substances exhibiting the coolest apparent temperature, such as water, tend to radiate more highly polarized signals than those specular materials exhibiting higher apparent temperatures. The exception, as shown by the curves of FIG. 2, is metal, which does not radiate polarized signals. The vegetation radiations also tend not to be polarized, but as shown by the curves of FIG. 1, they may be distinguished from metal since they have a much higher apparent temperature.

A radiometer suitable for implementing the concept of the present invention, and for utilization for reconnaissance, for example, is shown in FIG. 2. As indicated, the particular system of FIG. 2 is a background suppression radiometer using linear signal processing. The various stages of the radiometer are in themselves well known, and a detailed description of the individual stages is believed to be unnecessary for the complete understanding of the present invention.

The illustrated radiometer system of FIG. 2 includes a directional antenna 10 with polarized signal outputs coupled to a first microwave receiver radiometer channel 12 and to a second microwave receiver radiometer channel 14. The radiometer channel 12 responds to the received microwave radiometer signals from the antenna 10 which are vertically polarized, and it develops an output ($T_v$) whose amplitude is proportional to the amplitude of the received vertically polarized signals. The radiometer channel 14, on the other hand, responds to the received radiometer microwave signals from the antenna 10 which are horizontally polarized, and it develops an output ($T_h$) whose amplitude is proportional to the amplitude of the horizontally polarized signals.

The outputs of the channels 12 and 14 are applied to a subtractor 16. The subtractor network is constructed in known manner effective to subtract the output signal ($T_h$) from the output signal ($T_v$). The output ($T_v - T_h$) from the subtractor network 16 is applied to a multiplier network 18. The multiplier network responds to a constant signal ($k_f$) from an incidence angle sensor unit 20 so as to modify the signal ($T_v - T_h$) in accordance with the constant signal ($k_f$). The output from the multiplier 18 is added to the ($T_v$) signal from the channel 12 in an adder network 22. The resultant output signal from the system is a signal (T). The signal (T) increases above a predetermined threshold, only in the presence of a particular material, such as metal, in the area observed by the beam from the directional antenna 10. It will be appreciated that the system of FIG. 2 effectively implements the expression:

$$T_{background} = T_v + k_{f\ 1}(T_v\ cc - T_h) \quad (6)$$

As mentioned above, a similar system may be provided for implementing the equations:

$$(T_v + T_h) + k_{\zeta 2}(T_v - T_h) = T_{background} \qquad (7)$$

$$T_h + k_{\zeta 3}(T_v - T_h) = T_{background} \qquad (8)$$

The constant $(k)$ in each equation is selected to have an amplitude so as to suppress completely the received radiations from the most disturbing element, namely water, in the area observed by the antenna beam. As shown by the curves of FIG. 1, the radiations from the other elements in the observed area are not nearly as polarized as the radiations from water, and a constant $(k)$ which is optimized for water, but which is not optimized for the other elements, is sufficient to maintain all the various radiations from the different elements at the same level as the normal background which is selected for transmission. In this way, the output (T) from the radiometer of FIG. 2 rises above the threshold in a manner which is linearly related to the amount of metal present in the observed area, so that this output may be used in a null-seeking guidance system, in addition to the reconnaissance type of system shown in FIG. 2.

For the radiations received by the antenna 10, the following designations may be used:

$$A_b + A_w + A_m = 100\% \qquad (9)$$

Where: $A_b$ is the percentage due to normal terrain background;
$A_w$ is the percentage due to water;
$A_m$ is the percentage due to metal.

Therefore, the output $(T_v)$ from the vertically polarized microwave detector channel 12 may be expressed as:

$$T_v = A_b T_{b_v} + A_w T_{w_v} + A_m T_{m_v} \qquad (10)$$

and the output from the horizontally polarized microwave detector channel 14 may be expressed as:

$$(T_h) = A_b T_{b_h} + A_w T_{w_h} + A_m T_{m_h} \qquad (11)$$

Therefore, when $T_{w_v} + K_{\zeta}(T_{w_v} - T_{w_h})$ is set equal to $(T_b)$, and noting that $T_{m_v} - T_{m_h} = 0$, and $T_{b_v} - T_{b_h} = 0$ for a diffuse background like vegetation; then the output:

$$T_{b_v} + k_{\zeta}(T_{b_v} - T_{b_h}) = T_{b_v} = T_{b_h} \qquad (12)$$

$$T_{m_v} + K_{\zeta}(T_{m_v} - T_{m_h}) = T_{m_v} = T_{m_h} \qquad (13)$$

$$T_{w_v} + K_{\zeta}(T_{w_v} - T_{w_h}) = T_{b_v} = T_{b_h} \qquad (14)$$

Thus, the total output will equal:

$$A_m T_{r_m} + (A_b + A_w) T_{b_v} \qquad (15)$$

and detection occurs when:

$$A_m T_{r_m} + (A_b + A_w) T_{b_v} < T_{b_v} \qquad (16)$$

The aforesaid threshold is in the negative direction since the metallic objects are colder than the background. The threshold is independent of the elements which constitute the background, and detection depends only on the size of the metal object in the observed area.

Figure 3:
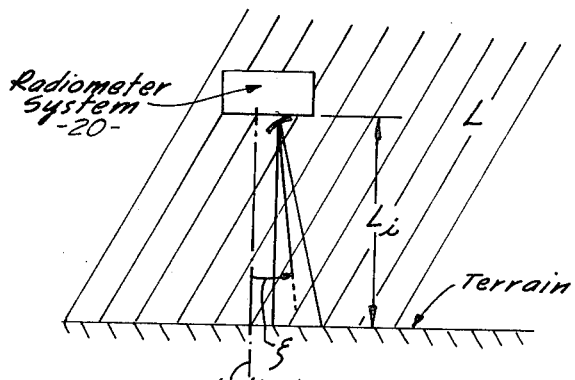
FIG. 3 is a representation of the orientation of the sensor in an atmospheric environment.

The following derivation may be made to demonstrate that the constant $k_\zeta$, which forces the aforesaid constant background, is independent of weather conditions. The constant $k_\zeta$ is set in accordance with data from the incidence angle sensor unit 20. As mentioned above, the incidence angle sensor unit 20 is a known type of instrument. Its orientation in the atmospheric environment is represented schematically in FIG. 3. In FIG. 3, the designation $(L_i)$ represents the loss along the path from the sensor to the terrain, and $(L)$ is the total atmospheric loss from which the sky radiation is derived:

Where: $T_w$ is the absolute temperature of the water;
$T_a$ is the temperature of the atmosphere;
$T_{a1}$ is the temperature of the atmosphere between the sensor and the terrain;
$T_b$ is the normal grass or vegetation background.

The equation to be solved for the case of water is:

$$T_{v_\zeta} + k_\zeta(T_{v_\zeta} - T_{h_\zeta}) = T_{background} \qquad (17)$$

It is to be noted that $T_{b_v} - T_{b_h} = 0$, and $T_b = T_{background} = $ constant.

Where: $\zeta$ relates directly to the incidence angle, and $k_\zeta$ is adjusted for incidence angles such that the above equality holds.

For the purposes of clarity in the following equations, the subscript $(\zeta)$ will be dropped. However, it should be recognized that the constant $(k)$ must be adjusted for the particular and perhaps varying incidence angle $(\zeta)$:

Now:

$$T_v + k(T_v - T_h) = (\epsilon_{w_v} T_w)(1/Li)$$
$$+ \left[\rho w_v \left(\frac{L-1}{L}\right) T_a\right](1/Li)$$
$$+ \frac{(Li-1)}{Li} T_{a_i}$$
$$+ k(\epsilon_{w_v} - \epsilon_{w_h})(T_w)(1/L_i) + (\rho_{w_v} - \rho_{w_h})$$
$$\left(\frac{L-1}{L}\right)(T_a)(1/L_i) \qquad (18)$$

and $$|\epsilon_{w_v} - \epsilon_{w_h}| = |\rho_{w_v} - \rho_{w_h}| = \Delta$$

(for any given incidence angle)

Rewriting, we have:

$$\frac{1}{Li}\left\{\epsilon_{w_v} T_w + \rho_{w_v}\left(\frac{L-1}{L}\right) T_a + (L_i-1) T_{a_i}\right.$$
$$\left. + k\Delta\left[T_w - \left(\frac{L-1}{L}\right) T_a\right]\right\} \qquad (19)$$

For simplicity let $T_w = T_{background} = T_a = T_a$.

(This is a very good approximation to the actual case. In addition, the results are not sensitive to variations as will be seen in the following development.)

Thus, we have:

$$\frac{T_b}{Li}\left\{\epsilon_{w_v} + \rho_{w_v}\left(\frac{L-1}{L}\right) + (L_i-1) + k\Delta\left(\frac{1}{L}\right)\right\} \qquad (20)$$

Using nominal values for $\epsilon$ and $\rho$ to show invariance of $k$ with $L$ and $L_i$ for any incidence angle:

at 30° incidence  $\epsilon_{w_v} = 0.5$   $\rho_{w_v} = 0.5$
$\Delta = 0.1$
$\epsilon_{w_h} = 0.4$   $\rho_{w_h} = 0.6$ at 50° incidence  $\epsilon_{w_v} = 0.6$   $\rho_{w_v} = 0.4$
$\Delta = 0.25$
$\epsilon_{w_h} = 0.35$  $\rho_{w_h} = 0.65$ Assume two weather cases, namely:

Case I — Clear weather where total atmospheric loss is 0.1 db and loss to the sensor from the terrain is 0.025 db.

Case II — Total atmospheric loss is 1.0 db and loss to sensor is 0.25 db.

For 30° incidence angle
Case I
$T_b = 147.8 + 28.4 k$
Case II
$T_b = 180.6 + 21.8 k$ Setting $T_b = 290$K and solving for $k$ we get $k = 5$.
Substituting in Case II we find the calculation:
$T_b = 289.6°$ For 50° incidence angle
Case I
$T_b = 176.2 + 71 k$
Case II
$T_b = 202.4 + 54.5 k$
Again allowing $T_b$ in Case I to equal 290° K we find $k = 1.6$.
Substituting in Case II — $T_b = 289.4$ This close indication implies a complete invariance of $k$ with weather. In the following we generalize and find this invariance to be true, starting from expression (20):

$$\frac{T_b}{L_i}\left\{\epsilon_{w_v} + \rho_{w_v} \frac{(L-1)}{L} + (L_i - 1) + k\Delta \frac{(1)}{L}\right\}$$

Setting this expression equal to $T_i$, we find:

$$\epsilon_{w_v} + \rho_{w_v} \frac{(L-1)}{L} + (L_i - 1) + k\Delta \frac{(1)}{L} = L_i$$

and $$\epsilon_{w_v} + (1 - \epsilon_{w_v}) \frac{(L-1)}{L} - 1 + k\Delta \frac{(1)}{L} = 0$$

hence:

$$\epsilon_{wv} - 1 + k\Delta = 0$$

$$k = \frac{\rho_{w_v}}{\Delta}; \text{ independent of } L \text{ or } L_i$$

Similarly, it can be shown for the approach:

$$T_h + k(T_v - T_h) = T_b$$

$$k = \frac{\rho_{w_h}}{\Delta}; \text{ independent of } L \text{ or } L_i$$

and for $$(T_h + T_v)/2 + k(T_v - T_h) = T_b$$

$$k = \frac{(\rho_{w_v} + \rho_{w_h})/2}{\Delta}; \text{ independent of } L \text{ or } L_i$$

Therefore, when the constant ($k$) is controlled to be dependent upon the incidence angle, it can be shown that the threshold setting of the system is completely independent of weather conditions, and of the actual incidence angle of the beam from the antenna 10.

Since the output from the radiometer of the invention is linearly related to the amount of metal in the observed area, the system may be used for tracking purposes, as explained above. One such tracking system using the lobe comparison method is shown in FIG. 4.

Figure 4:
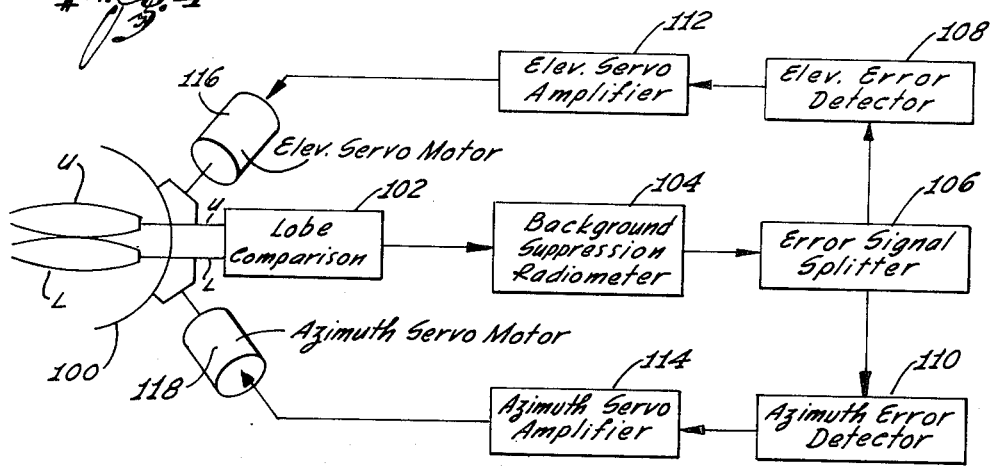
FIGS. 4 and 5 are block diagrams of tracking systems utilizing the concepts of the present invention, the tracking system of FIG. 4 utilizing a lobe comparison tracking technique, and the tracking system of FIG. 5 using a conical scan tracking technique.

The system of FIG. 4 includes a directional antenna 100 which is constructed to radiate antenna beams in two distinct lobes for each axis. One axis is shown, having one beam crossed over another, the upper lobe being designated as U, and the lower lobe being designated as L. The signals received by the antenna 100 are introduced to a lobe comparator unit 102 which compares the signal received from the lobes U and L, and the resulting output from the unit 102 is applied to a background suppression radiometer 104, which may be constructed to incorporate the concepts of the invention.

It will be appreciated that the radiometer 104 may be designed to develop outputs above a particular threshold when the antenna beams encounter an amount of metal in the observed area above a predetermined minimum, which are related to a metal object in the area observed by the two antenna beams from the antenna 100, and which designate which of the two beams is more completely centered on the metal object.

These outputs are applied to an error signal splitter 106 which, in turn, controls an elevation error signal detector 108 and an azimuth error detector 110. The outputs from the error signal detectors 108 and 110 are applied through respective elevational servo amplifiers 112 and azimuth servo amplifiers 114 to a corresponding elevational servo motor 116 and to a corresponding azimuth servo motor 118. These servo motors control the antenna 100, so as to hold it tracked on the metal object, such that the signals intercepted by the upper and lower lobes U and L of the antenna 100 are maintained of equal amplitude, so that both lobes are equally intercepted by the metal object.

Figure 5:
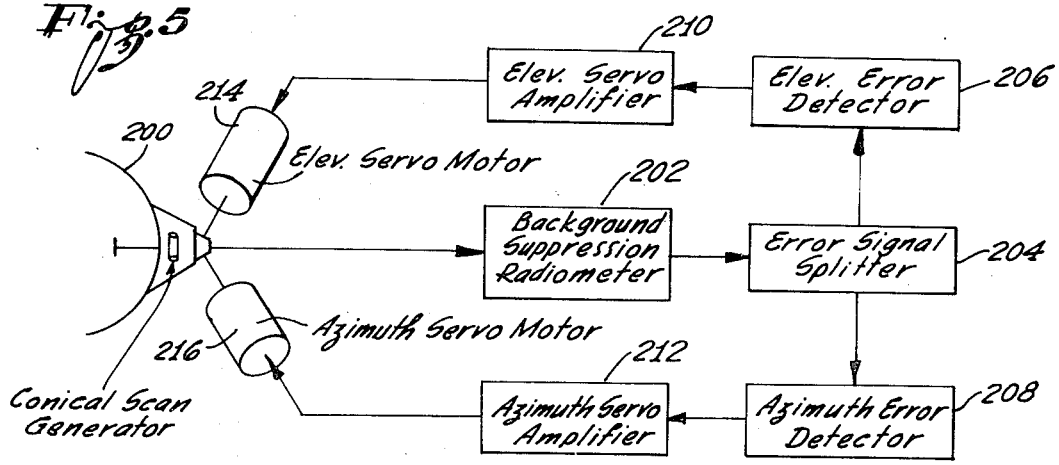

A somewhat similar system is shown in FIG. 5. However, the latter system utilizes an antenna 200 which is normally controlled so that its beam scans in a conical manner. The resulting signals intercepted by the antenna beam are received and detected in a background suppressing radiometer 202, which likewise may be constructed to incorporate the concepts of the invention.

So long as the antenna beam is centered on the metal object in the area scanned by the antenna beam, the output from the radiometer 202 remains essentially constant for each scan of the antenna. This output is applied to an error signal splitter circuit 204 which then applies equal outputs to the elevation and azimuth error detectors 206 and 208.

Under the aforesaid conditions, the corresponding elevational servo amplifier 210 and the azimuth servo amplifier 212 apply equal signals to the elevation and azimuth servo motors 214 and 216, so that there is no elevational or azimuth movement of the antenna. However, whenever the scanning antenna beam tends to move off center from the metal object, the resulting unbalance of the azimuth and elevation signals causes the servo motors 214 and 216 to return to its centered position. In this way, the antenna is tracked on the metal in the area under observation.

It will be appreciated, of course, that reconnaissance radiometer systems may be constructed which, like the guidance systems of FIGS. 4 and 5, employ multiple fixed directional antenna beams, or one or more scanning antenna beams.

The invention provides, therefore, a simple radiometer which functions to suppress all signals to a background level, and which causes the common output to rise above a particular threshold as a linear function of a particular object in the terrain under observation, such as metal.

The radiometer of the invention is eminently simple since it utilizes a linear processing technique for the received signals. Moreover, the threshold may be controlled to be independent of weather conditions and incidence angles, further to simplify the system. As described, the fact that the system produces a linearly related output with respect to metallic objects, for example, in the observed area, the system is well suited for tracking type guidance systems, as described in conjunction with FIGS. 4 and 5.

What is claimed is:

1. A microwave radiometric system including: a directional antenna capable of receiving radiation microwave signals emitted by different materials in an area under observation, certain of said microwave signals being polarized and said microwave signals having amplitudes related to the apparent temperatures of the said materials, and one of said signals representing background radiations of the aforesaid area; first radiometric detector channel means coupled to said antenna for receiving and detecting vertically polarized microwave signals ($T_v$) intercepted by said antenna; second radiometric detector channel means coupled to said antenna for receiving and detecting horizontally polarized microwave signals ($T_h$) intercepted by said antenna; subtractor circuitry coupled to said first and second radiometric channel means for deriving a difference signal output ($T_v - T_h$) in response to the output signals from said first and second radiometric detector channel means; and means including adder circuitry coupled to said subtractor circuitry and to at least one of said first and second radiometric detector channel means for producing an output (T) having an amplitude related to said background signals and which is below a particular threshold in the absence of a particular material in the area under observation and regardless of the mixture of other materials which may be present in the area under observation; and said output (T) exceeding the said threshold in the presence of said particular material in the area under observation.

2. The microwave radiometric system defined in claim 1, and which includes a multiplier circuit interposed between said subtractor circuitry and said adder circuitry to suppress the output ($T_v - T_h$) from said subtractor in accordance with a particular constant ($k$).

3. The microwave radiometric system defined in claim 2, and which includes an incidence angle sensor unit coupled to said last-named circuit for setting said constant ($k$) in accordance with an incidence angle.

4. The microwave radiometric system defined in claim 1, in which said particular material is metal.

5. The microwave radiometric system defined in claim 2, in which said constant ($k$) is selected completely to suppress radiations derived from water or other highly polarized material, in said observed area.

6. The microwave radiometric system defined in claim 2, and which includes tracking means mechanically coupled to said antenna, and servo circuitry coupled to said adder circuitry and responsive to variations in said output (T) above the aforesaid threshold to control said tracking means.

7. The microwave radiometric system defined in claim 6, in which said antenna has multiple lobe directional characteristics.

8. The microwave radiometric system defined in claim 6, in which said antenna is controlled to provide a conically scanned directional beam in the area under observation.

9. The microwave radiometric system defined in claim 1, in which said antenna has multiple fixed beam directional characteristics.

10. The microwave radiometric system defined in claim 1, in which said antenna includes at least one scanning beam.

* * * * *